(12) United States Patent
Hering et al.

(10) Patent No.: US 10,489,862 B2
(45) Date of Patent: Nov. 26, 2019

(54) SYSTEMS AND METHODS FOR COMPUTING DEVICE PROTECTION

(71) Applicant: Lookout, Inc., San Francisco, CA (US)

(72) Inventors: John Gunther Hering, San Francisco, CA (US); Kevin Mahaffey, San Francisco, CA (US); Brian James Buck, Livermore, CA (US); William Neil Robinson, Sunnyvale, CA (US)

(73) Assignee: LOOKOUT, INC., San Francisco, CA (US)

( * ) Notice: Subject to any disclaimer, the term of this patent is extended or adjusted under 35 U.S.C. 154(b) by 514 days.

(21) Appl. No.: 14/715,198

(22) Filed: May 18, 2015

(65) Prior Publication Data

US 2016/0343083 A1 Nov. 24, 2016

(51) Int. Cl.
*G06Q 40/08* (2012.01)
*G06F 21/56* (2013.01)
*G06F 21/50* (2013.01)

(52) U.S. Cl.
CPC .............. *G06Q 40/08* (2013.01); *G06F 21/50* (2013.01); *G06F 21/56* (2013.01); *G06F 2221/033* (2013.01); *G06F 2221/034* (2013.01)

(58) Field of Classification Search
CPC ............................ B42D 15/0033; G06Q 40/08
USPC .............................................................. 705/4
See application file for complete search history.

(56) References Cited

U.S. PATENT DOCUMENTS

| | | | | |
|---|---|---|---|---|
| 7,059,182 | B1* | 6/2006 | Ragner | H05K 5/0086 73/200 |
| 9,127,946 | B1* | 9/2015 | Menon | G06Q 40/08 |
| 2005/0055248 | A1* | 3/2005 | Helitzer | G06Q 40/08 705/4 |
| 2006/0015374 | A1* | 1/2006 | Ochs | G06Q 40/00 705/4 |
| 2010/0062833 | A1* | 3/2010 | Mattice | G11B 19/042 463/24 |
| 2010/0174566 | A1* | 7/2010 | Helitzer | G06Q 40/08 705/4 |
| 2011/0161118 | A1* | 6/2011 | Borden | G06Q 40/08 705/4 |
| 2011/0215940 | A1* | 9/2011 | Bartholomeyczik | G01P 15/0891 340/669 |
| 2012/0116696 | A1* | 5/2012 | Wank | G01R 31/42 702/58 |
| 2014/0025401 | A1* | 1/2014 | Hagelstein | G06Q 50/22 705/4 |
| 2014/0359777 | A1* | 12/2014 | Lam | G06F 21/577 726/25 |
| 2014/0380264 | A1* | 12/2014 | Misra | G06F 8/00 717/100 |

(Continued)

OTHER PUBLICATIONS

Weingart Steve H, Physical Security Devices for Computer Sybsystems;, Springer-Verlag Berlin Heidelberg (Year: 2000).*

(Continued)

*Primary Examiner* — Bruce I Ebersman
*Assistant Examiner* — Kevin T Poe
(74) *Attorney, Agent, or Firm* — Greenberg Traurig, LLP

(57) ABSTRACT

Embodiments of the present disclosure help protect computing devices by, among other things, identifying events that may pose a risk to a computing device based on data from sensors coupled to the computer device.

10 Claims, 2 Drawing Sheets

(56) References Cited

U.S. PATENT DOCUMENTS

| | | | |
|---|---|---|---|
| 2015/0019266 A1* | 1/2015 | Stempora | G06Q 40/08 705/4 |
| 2016/0180061 A1* | 6/2016 | Pogorelik | G06F 21/10 713/189 |
| 2016/0180078 A1* | 6/2016 | Chhabra | G06F 21/31 726/19 |
| 2016/0218556 A1* | 7/2016 | Slaby | H02J 9/06 |

OTHER PUBLICATIONS

GB Application No. 1608179.6, Combined Search and Examination Report, dated Oct. 21, 2016.

* cited by examiner

SYSTEMS AND METHODS FOR COMPUTING DEVICE PROTECTION

BACKGROUND

The use of computing devices has steadily increased as such devices have become more capable. However, this rise in capability is often accompanied by an increase in complexity and cost, such that the damage or loss of a computing device (such as smartphones, tablets, watches and other wearable computing devices, and/or laptop computers). Additionally, computing devices are increasingly portable, further exposing them to the risk that they may be damaged (e.g., by being accidentally dropped) or lost (e.g., by being misplaced or stolen).

Embodiments of the present disclosure help to address issues related to protecting computing devices.

SUMMARY

Embodiments of the present disclosure help protect computing devices by, among other things, identifying events that may pose a risk to a computing device based on data from sensors coupled to the computer device. A computer-implemented method according to various aspects of the present disclosure includes: receiving data pertaining to a computing device from a sensor coupled to the computing device; identifying, based on the sensor data for the computing device, an event posing a risk to the computing device, wherein the risk comprises one or more of damage to the computing device and loss of the computing device; and presenting, based on the identified event, an offer to insure the computing device to a user of the computing device.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
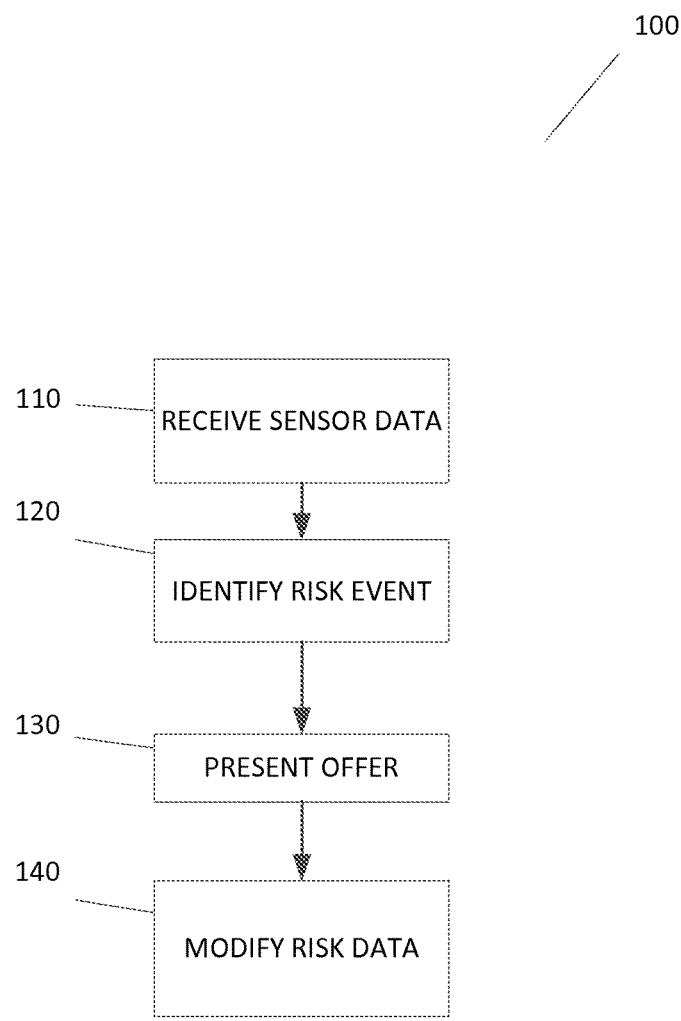
FIG. 1 is an exemplary process according to various aspects of the present disclosure.

FIG. 1 is an exemplary process according to aspects of the present disclosure. In this example, method 100 includes receiving data from a sensor coupled to a computing device (110), identifying an event posing a risk to the computing device based on the sensor data (120), presenting an offer to insure the computing device to a user of the computing device (130), and modifying risk data based on the received sensor data (140). The steps of method 100 may be performed (in whole, in part, and/or in conjunction with other steps) using any combination of computing devices, such as the server computing device 210 and client computing device 220 depicted in FIG. 2.

The sensor data may be received (110) by any number of different systems, devices, and/or software applications. In one exemplary embodiment, data is received from a sensor coupled to a computing device by a software application running on the computing device. In this example, the software application operating on the computing device could also perform steps 120-140 of method 100, alone or in conjunction with another device.

The sensor data may pertain to any type of computing device, such as a smartphone, a laptop computer, a desktop computer, a mobile subscriber communication device, a wearable computing device, a personal digital assistant (PDA), a tablet computer, an electronic book or book reader, a digital camera, a video camera, a video game console, and/or any other suitable computing device.

Data may be received (110) from any number and type of different sensors, and any number of different events posing a risk may be identified (120) using the sensor data. For example, an event posing a risk may be identified (120) based on determining that data from one or more sensors exceeds a predetermined threshold. Any desired thresholds can be utilized, including thresholds provided by third parties (such as an insurance provider associated with the offer to insure the computing device that is presented to the user) as well as thresholds that are selected based on risk data for other computing devices, such as devices that have one or more characteristics in common with the computing device the sensor data pertains to. As used herein, a "common characteristic" refers to any feature that is the same or similar to a feature of another computing device for purposes of evaluating a risk, but such characteristics need not be identical. In some exemplary embodiments, the sensor data may include data from a thermal detector, and an event posing a risk to the computing device may be identified in response to a temperature measured from the thermal detector that is below a first threshold (e.g., too cold) or above a second threshold (e.g., too hot).

Risks identified by the embodiments of the present disclosure may include any event posing any sort of risk to the device. For example, an event may be identified as posing a risk to a computing device where the event could cause damage to the computing device. Such damage may include, for example, the complete or partial or degradation destruction of a component and/or function of the device, physical damage (e.g., a cracked display screen), damage to a software component (e.g., an application is rendered at least partially inoperable, data is lost or stolen, etc.), cosmetic damage (e.g., a scratch or dent in the casing of the device that may or may not affect its functionality), and/or economic damage (e.g., the device is worth less after the event than before the event). Damage to the computing device may also include the computing device running slower than normal, being unable to access all of the files in memory, being unable to decrypt some files, being unable to remove a file from memory, and/or having corrupted file content which degrades the functionality of the computing device. An event may also pose a risk to the device where it may involve the loss of the device, such as due to the device being misplaced or stolen.

In some embodiments, data may be received from a moisture detector, and an event posing a risk to the computing device may be identified in response to the moisture detector measuring a level of moisture that exceeds a predetermined threshold. Data may also be received from an altimeter, and an event posing a risk to the computing device identified in response to the altitude (or elevation) of the computing device exceeding a predetermined height or depth.

In other exemplary embodiments, sensor data may be received from a location detector that provides the location of the mobile device. In some embodiments, the location detector may include a global positioning system (GPS) embedded within a computing device. In addition, or in the alternative, the location detector may comprise software or hardware that analyzes the network(s) to which the computing device is connected and/or in communication with the computing device and, based on the strength of the connection to such networks, determine the location of the computing device. For example, in cases where a computing device connected to, or in communication with, a cellular network, the cellular base stations (and their locations) in communication with the computing device may be used to identify which cell the computing device is located. Likewise, the location of wireless access points connected to a computing device (and the strength of such connections) can be used to identify the location of the computing device. Furthermore, location data for the computing device from multiple sources may be analyzed to help improve the accuracy of the location determination.

In embodiments utilizing data from one or more location detectors an event that poses a potential risk to the computing device may be identified in response to determining that the computing device is in an unexpected location. For example, embodiments of the present disclosure may analyze the history of locations of the computing device and identify a potential risk to the computing device in response to determining that the computing device is unexpectedly outside a predetermined distance from the locations the computing device is typically found. In this example, determining that the computing device is in an unexpected location may be indicative that the user of the computing device is travelling, in which case the user may wish to insure the computing device against damage or loss (including theft) while travelling.

Location information for the computing device may also be used to determine that the computing device is in a location associated with an elevated risk of loss and/or damage to the device. For example, embodiments of the present disclosure may identify a risk to the computing device in response to determining that the computing device is located in a transit hub (such as an airport or subway) and that the transit hub is, based on data collected for other devices having one or more characteristics in common with the computing device from to which the location information pertains, associated with an elevated risk of theft of the computing device. Similarly, the location information may be used to determine that the computing device is at an elevated risk of damage, such as in cases where the mobile device is located near a body of water, rough terrain (such as a ski slope), and/or elevated terrain (such as a mountain trail).

In some exemplary embodiments, location information from a location detector can be used to identify dynamic threats to the computing device. For example, location information for the computing device can be compared against weather information to identify conditions (e.g., rain, an electrical storm, etc.) that may pose a risk to the computing device. Similarly, the present location of the computing device can be compared against the locations of computing devices associated with individuals related to the theft of computing devices determined, for example, based on publically-available court records.

The sensor data may further be received from one or more inertial sensors, such as one or more accelerometers, gyroscopes, and/or magnetometers (e.g., compasses). Inertial sensors may be used (alone or in conjunction with each other) as location detectors. Additionally, such sensors may be used to identify events posing a risk to the computing device, such as determining, based on data from an accelerometer, that the computing device experiences a rapid deceleration. Further, embodiments of the present disclosure can identify that the computing device has been dropped based on, for example, a period of free fall measured by the accelerometer followed by the measuring of the rapid deceleration.

Data from the inertial sensor(s) may also be used to identify the force of impact experienced by the computing device. Such data may be used in conjunction with other information, such as the results of a diagnostics program operating on the computing device, to help specifically identify damage (or potential damage) to the computing device. Additionally, embodiments of the present disclosure may determine whether data from the accelerometer or other sensors is indicative of the computing device being accidentally dropped or intentionally thrown.

For example, in cases where data from an accelerometer coupled to the computing device shows the computing device experienced an acceleration consistent with normal gravity, and data from a gyroscope coupled to the computing device indicates the computing device experienced little or no rotation before impact, then a determination may be made that the computing device was likely dropped accidentally. In a contrasting example, where the data from the accelerometer indicates an acceleration significantly higher than normal gravity, and the gyroscope measures multiple rotations of the computing device before impact, a determination may be made that the computing device was likely intentionally thrown.

Thresholds for the sensor data may be selected such that an event posing a risk is identified before actual harm is done to the device. For example, in embodiments where data from a thermal detector is received, the upper threshold (e.g., for excessive heat) or the lower threshold (e.g., for excessive cold) could be selected such that the offer for insurance is presented to the user of the computing device (130) before temperatures reach an extreme in either case that is likely to harm the computing device. Among other things, presenting the offer for insurance (130) prior to any actual damage occurring to the mobile device serves to warn the user of the computing device of potentially harmful situations (allowing the user the to correct the situation) and provides the offer early enough that the offer isn't being extended to a device that is already damaged, thus helping to protect the insurer from excessive claims.

Events posing a risk to the computing device may be identified (120) using data from one sensor or from multiple sensors. For example, data from multiple sensors may be used to determine that a mobile device (or user thereof) is engaged in a situation or activity that poses a risk to the device. In one embodiment, for example, data from a location detector coupled to the computing device may be used to determine that the computing device is near, in, or on, a body of water, while data from a moisture sensor coupled to the computing device is used to determine that the device is being exposed to an excessive level of moisture. The combination of the data from the two sensors may thus be used to determine that the user is likely swimming or boating with the computing device on his/her person.

In another example, data from an altimeter coupled to a computing device may indicate that a computing device is at an excessively high altitude, while a thermal detector indicates an excessively low temperature, a moisture detector detects moisture consistent with fog or clouds, and a location detector indicates the user is located on a mountain. In this example, the combination of sensor data may be used to determine that he user is mountain climbing and/or hiking, and that the computing device may be at risk of being dropped from an excessive height or subjected to inclement weather conditions.

Events posing a risk to the computing device may be identified (120) based on other information in addition, or in the alternative, to the sensor data. For example, an event posing a risk to the computing device may be identified in response to virus protection software (or another system or software application) detecting the presence of malware on the computing device. An offer for insurance may be directed not only to the identified event (e.g., a potential loss and/or theft of data from the malware) but also to other related (e.g., identity theft protection insurance) or unrelated (e.g., protection for breakage of the display screen) coverage.

Events posing a risk to a computing device may also be identified based on the expiration of an insurance policy for a computing device, the initiation of a "device locate" operation by the user of the device or another entity, the elapsing of a predetermined period of time from one or more of the: purchase of the device, activation of the device, and installation of a software application on the device.

In another example, events posing a risk to the computing device may be identified (120) based on a history of identified events (and/or received sensor data) for the computing device, as well as based on risk data pertaining to other computing devices. In this context, "risk data" refers to any data that may be used to determine a probability that a particular computing device will experience damage and/or loss base on one or more identified events.

For example, consider a particular computing device ("Device A") that is determined to have been dropped based on data received from inertial sensors coupled to Device A as discussed above. In this example, Device A is determined to have been dropped six times prior to the latest identified drop (i.e., the seventh drop) based on previously-received sensor data. Risk data for a plurality of other computing devices having one or more characteristics in common with Device A (e.g., common manufacturer, weight, dimensions, screen thickness or other components features, etc.) may be analyzed and a determination made that the glass in the display screen of Device A has a 20% probability of cracking with every drop before the tenth drop, but a 70% probability of cracking with every drop after and including the tenth drop.

Based on the risk data for the other computing devices, embodiments of the present disclosure may select a threshold of seven drops to present (130) an offer for insuring the computing device against damage to the display screen (as well as other events), thus allowing the user to insure the device before the device is likely to be damaged. The threshold may also be provided by an insurer associated with the offer for insurance. In this manner, embodiments of the present disclosure can use historical data from a computing device and historical data from other related devices to determine specific risk probabilities and identify appropriate thresholds for offering insurance for the computing device. This not only helps provides a benefit to the user of the computing device before the computing device is damaged, but helps insurers distribute such offers while such computing devices are still in good working order.

Embodiments of the present disclosure may be used to offer insurance policies to groups of computing devices associated with a particular, user, organization, and/or system of networked devices. In such cases, an event identified for one computing device in a collection may trigger offers for insurance on one or more other devices in the collection, regardless of whether such devices experienced the event. In this manner, embodiments of the present disclosure can simultaneously offer insurance coverage to a collection of computing devices without necessitating prior intervention from users or administrators of the collection.

In a collection of devices, the identified event posing a risk to a device may include the identification of one or more uninsured devices in a collection of devices. The identified event may also be identified in response to determining that a new device is added to a collection, determining that the number of devices in a collection has met or exceeded a predetermined threshold, identifying a hardware or software failure on a device in the collection, as well as to determining that a device associated with a group of devices has not been detected for at least a predetermined period of time. In the latter case, the absence of a device may be indicative of the device being lost or damaged. In each case, an offer to insure one or more devices in the collection may be presented (130). Such offers may apply only to uninsured devices or add/modify coverage to existing policies.

Embodiments of the present disclosure can also help provide complete coverage to collections of devices associated with different entities. For example, it is common within many business organizations for there to be a mixture of devices connected to the organization's network that are owned/licensed by the organization itself or owned by individual employees/members of the organization. For example, a particular employee ("Employee A") may be issued a desktop computer and laptop computer by his company, but also uses his smartphone and tablet computer to connect to the company's network, access files and email, etc. Employee A's use of the smartphone and tablet computer are commonly referred to as policies known as "bring your own device" (BYOD) or "bring your own technology" (BYOT). In cases, where organizations permit BYOD/BYOT, embodiments of the present disclosure can identify each of the four devices as being part of the organization's collection of devices, and provide insurance offers to some or all of the individual devices in the collection in response to various events identified as posing a risk to a particular device and/or the entire collection and based on preferences of the organization, members of the organization, and insurance providers.

For example, an offer for insurance for a collection of devices may be presented (130) in response to a variety of events, including the number of BYOD/BYOT devices meeting or exceeding a predetermined threshold, the status of a member within the organization changing, the addition or departure of a member of the organization, the detection of an enterprise-level cyber security event, as well as other events discussed herein.

Insurance policies offered for devices in a collection may be customized based on the type of device, the user(s) associated with the device, the location of the device, and other factors. Such coverage may be offered for mobile devices that can be easily removed from an organization's premises and/or used for multiple purposes outside of those of the organization. For example, an insurance policy might cover a particular device during its use in work-related conditions, but not during its use for personal reasons.

In such cases, embodiments of the present disclosure may utilize the sensor(s) coupled to the computing device and other hardware or software components to monitor the usage of the device to help determine the manner in which the device is used at the time the device is lost or damaged to help resolve the resulting insurance claim. For example, a location detector (e.g., as described above) may be used to identify when the device is at a work location, within a predetermined distance of a work location, accompanying a user of the device on work/business trips, accompanying user while the user is working from home (i.e., telecommuting), accompanying the user while the user is travelling for personal reasons, and other events. In this manner, embodiments of the disclosure can provide customized insurance offers to organizations that cover specific uses of a mobile device and exclude others to help reduce the overall costs of insuring the devices used in the organization. Additionally, some embodiments may provide separate offers to the device user to cover personal usage of a device where the user's organization does not cover such use. Such separate offers may be provided at the same cost as offered to the organization, thus allowing the user to benefit from bulk insurance purchases by the organization.

Embodiments of the present disclosure may present (130) an offer to insure a computing device that provides any desired coverage, and which may be based on any desired criteria. For example, an offer for insurance of a computing device may selectively provide coverage based on the age of the device, type of the device and/or its components, events identified (or not identified) for the device, an event associated with a user of the computing device (whether or not it occurs on a particular device), an organization associated with the computing device and/or to which the user belongs, as well as other factors.

For example, presentation of an offer to insure a computing device (130) may include determining that the user does not have an existing insurance policy covering the computing device to avoid duplicate coverage. Such a determination may be performed by retrieving policy information from a database, communicating with a service provider associated with the computing device, and/or by retrieving information from an insurance exchange or provider.

Presentation of the offer (130) may also include identifying a number of insurance claims made by the user within a predetermined period of time, results of diagnostics run on the computing device (e.g., to assess the health of the device), as well as analyzing the repair history of the computing device.

In some embodiments, the offer to insure a computing device may be generated by the same entity (e.g., an insurance provider) that provides the system for receiving the sensor data (110), identifying the event posing a risk to the computing device (120) or other functionality related to the present disclosure. In other embodiments, the offer to insure a computing device may be received from, or generated in behalf of, a third party insurer. In such cases, presenting the offer for insuring the computing device (130) may include transmitting the sensor data received from the computing device (and/or information describing the identified event posing a risk to the computing device) to the insurance provider. Information identifying the user of the computing device may also be provided to the insurance provider. The insurance provider may then respond with an approval or disapproval to provide the offer to insure the computing device. Such communication may occur between computing devices in communication with each other via a network, such as network 230 shown in FIG. 2 and described in more detail below.

The offer to insure a computing device may be presented (130) to a user in any suitable manner. In some embodiments, for example, the offer may be presented (130) via an electronic message to the user via email, short message service (SMS), multimedia messaging service (MMS), transmission control protocol/Internet protocol (TCP/IP) networking protocols, and/or using any other desired message format and communication protocol. Such messages may include text, data, a hyperlink to a website, and other information.

The offer to insure the computing device may also be provided directly to the computing device via a display window. The offer to insure a computing device may be encrypted and/or require verification/validation of the user by the computing device to access the offer. For example, a user may be required to enter a password, personal identification number (PIN), swipe pattern, biometric (e.g., fingerprint scan), or other validation before receiving the offer for insurance. Such validation may be presented, for example, by unlocking the display screen of the computing device or separate/additional validation may be required from the user to receive the offer.

In some embodiments, information on the health/status of the computing device may be provided to an insurance provider as part of generating the offer, presenting the offer, and/or as a condition of acceptance of the offer by the user of the computing device. In some embodiments, such information may be automatically retrieved from the computing device using diagnostic software operating on the device or another system in communication with the device. Additionally, such diagnostic information may be retrieved subsequent to the acceptance of the insurance offer to help monitor the status of the device and identify events that may trigger the insurance policy associated with the device.

In some exemplary embodiments, the user is instructed to take a picture of a mobile computing device in a mirror using a camera mounted in the device that faces in same direction as the display screen (i.e., a front-facing camera). In this example, a software application on the mobile device displays a picture or pattern on the screen of mobile device as the user takes the picture. The application captures the image, which is used to determine that the display is operative and not cracked. The user may also be required to take images of the sides and/or back of the device via the mirror (e.g., using a back-facing camera) to verify the body, ports, and other portions of the device are not damaged. The user may also (or alternatively) be instructed to take a video of the camera. By capturing the image/video directly from the camera by the software application, embodiments of the present disclosure help ensure that the images are not tampered with. Such images/video can also be used to diagnose issues with the camera(s), such as cracked lenses and the like.

The sensor data received from the computing device may be used to modify risk data (140) collected for a group of computing devices having one or more characteristics in common with the device providing the sensor data. As described above, risk data for a plurality of computing devices having one or more characteristics in common with a device from which sensor data is received can be used to identify events posing a risk to the device. As sensor data and/or information regarding identified events is collected over time, such information may be used to modify the existing risk data, thereby providing a statistically better collection of data upon which to identify future risk events.

As described previously, the functionality of embodiments of the present disclosure may be implemented using any number of different computing devices. In one exemplary embodiment, a server generates updated risk data associated with a population of mobile devices based on the data associated with the detection of an event from a computing device as well as data received from other computing devices having at least one characteristic in common (i.e., the same or similar for purposes of evaluating risk) with the mobile device. The updated/modified risk data is then used in identifying future events that may pose a risk to computing devices.

Figure 2:
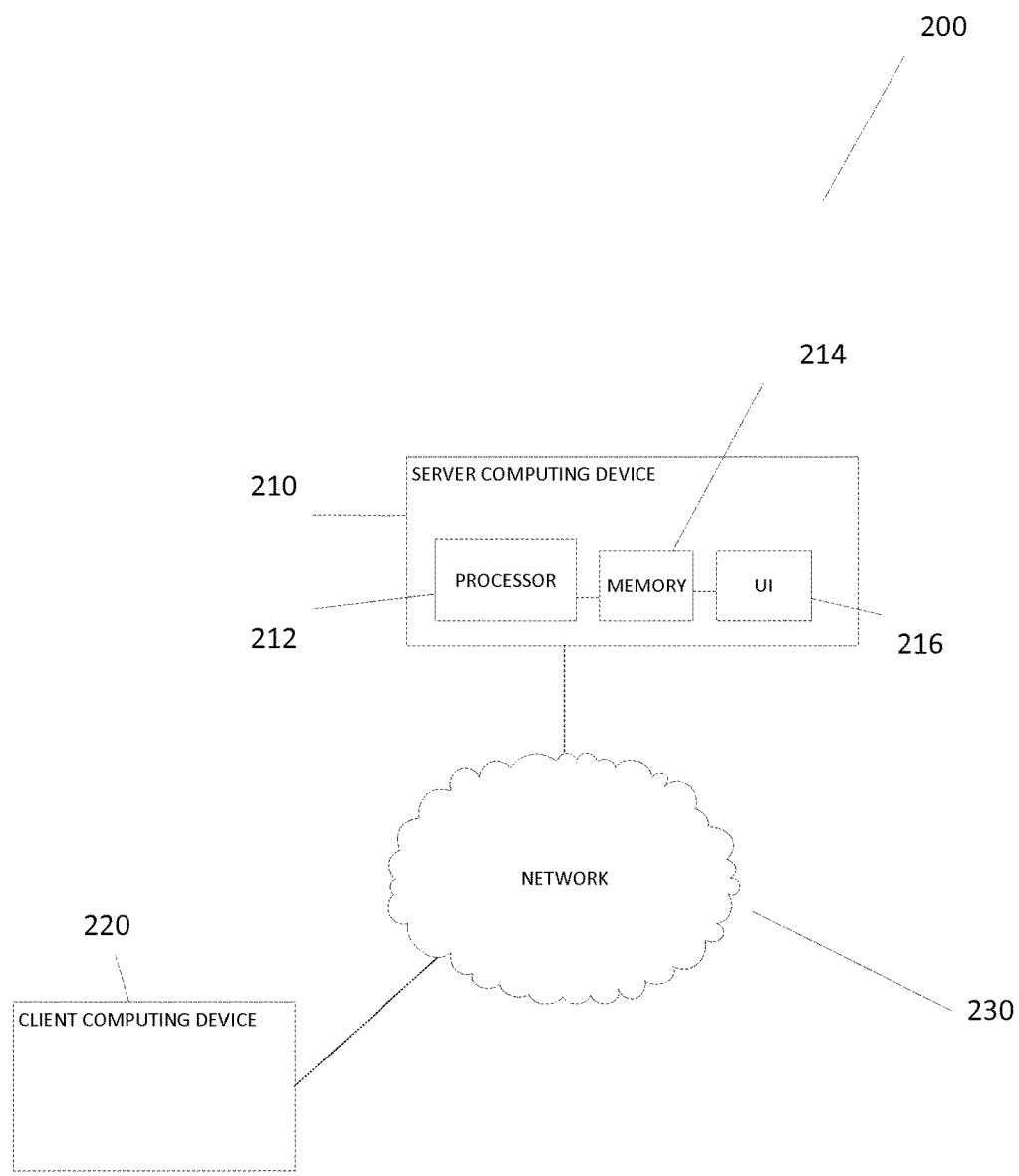
FIG. 2 is a block diagram of an exemplary system according to various aspects of the present disclosure.

FIG. 2 is a block diagram of system which may be used in conjunction with various embodiments. While FIG. 2 illustrates various components of a computer system, it is not intended to represent any particular architecture or manner of interconnecting the components. Other systems that have fewer or more components may also be used.

In FIG. 2, system 200 includes a server computing device 210 comprising a processor 212, memory 214, and user interface 216. Server 210 may include any number of different processors, memory components, and user interface components, and may interact with any other desired systems and devices in conjunction with embodiments of the present disclosure. Client computing device 220 may likewise include similar components.

The functionality of the server 210 and/or client 220, including the steps of the methods described above (in whole or in part), may be implemented through the processor(s) of the respective system (e.g., processor 212) executing computer-readable instructions stored in the memory (e.g. memory 214). The memory of the server 210 and/or client 220 may store any computer-readable instructions and data, including software applications, applets, and embedded operating code. Any combination of the functionality of the methods described herein may be performed via software operating on the server 210 and/or client 220.

The functionality of the system 210 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components.

In the server 210, for example, the processor 212 retrieves and executes instructions stored in the memory 214 to control the operation of the system 210. Any type of processor, such as an integrated circuit microprocessor, microcontroller, and/or digital signal processor (DSP), can be used in conjunction with embodiments of the present disclosure. A memory 214 operating in conjunction with embodiments of the disclosure may include any combination of different memory storage devices, such as hard drives, random access memory (RAM), read only memory (ROM), FLASH memory, or any other type of volatile and/or non-volatile memory. Data can be stored in the memory 214 in any desired manner, such as in a relational database.

The server 210 and/or client 220 may include a user interface (e.g., user interface 216) that may include any number of input devices (not shown) to receive commands, data, and other suitable input. The user interface of the server 210 and/or client 220 may also include any number of output devices (not shown) to provides the user with data, notifications, and other information. Typical I/O devices may include mice, keyboards, modems, network interfaces, printers, scanners, video cameras and other devices.

The server 210 and client 220 may communicate with any number of other systems and devices in any desired manner, including via network 230. The server 210 and/or client 220 may be, include, or operate in conjunction with, a laptop computer, a desktop computer, a mobile subscriber communication device, a smartphone, a personal digital assistant (PDA), a tablet computer, a wearable computing device, an electronic book or book reader, a digital camera, a video camera, a video game console, and/or any other computing device.

The network 230 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
   receiving sensor data pertaining to a computing device from a plurality of sensors coupled to the computing device, wherein the sensors include an accelerometer and a gyroscope;
   obtaining data from the gyroscope, the data indicating an extent of rotation of the computing device during a period of free fall;
   identifying, based on the sensor data, occurrence of an event posing a risk of damage to the computing device, wherein identifying the event includes:
      determining a plurality of computing devices having a characteristic in common with the computing device,
      selecting a threshold associated with a force of impact based on historical data associated with screen damage for the plurality of computing devices, wherein the historical data includes sensor data associated with damage that is received from computing devices other than the computing device,
      determining that the sensor data for the computing device exceeds the threshold,
      determining, based on data from the accelerometer, that the computing device experiences deceleration,
      determining that the computing device is dropped based on the period of free fall and the deceleration, and
      determining based on the data from the accelerometer and the data from the gyroscope that the computing device was accidentally dropped;
   obtaining results of diagnostics for the computing device, wherein the results of diagnostics include an image or video from a camera of the computing device, the image or video including at least a portion of a screen of the computing device, and wherein the results of diagnostics further include diagnostics from a diagnostics program operating on the computing device;
   identifying a force of impact experienced by the computing device;
   identifying, based on the results of the diagnostics and the identified force of impact, damage or potential damage to the computing device;
   transmitting, to a different computing device, an electronic message including the sensor data for the computing device, the results of the diagnostics, and identification information for the computing device, wherein the different computing device is configured to send a reply communication;
   in response to receiving the reply communication, transmitting an electronic message to the computing device regarding the event; and
   modifying, based on the sensor data for the computing device, risk data for the plurality of computing devices.

2. The method of claim 1, wherein the sensors further include a thermal detector, and determining that the sensor data exceeds the threshold includes determining that a temperature measured by the thermal detector is below a first threshold or above a second threshold.

3. The method of claim 1, wherein the sensors further include a location detector and determining that the sensor data exceeds the threshold includes determining that the computing device is within a predetermined distance of another computing device.

4. The method of claim 1, wherein the sensors further include a moisture sensor and determining that the sensor data exceeds the threshold includes determining that a level of moisture measured by the moisture detector exceeds a predetermined amount.

5. The method of claim 1, wherein the sensors further include an altimeter and determining that the sensor data exceeds the threshold includes determining that an altitude measured by the altimeter exceeds a predetermined level.

6. The method of claim 1, wherein the sensors further include a location detector and identifying occurrence of the event posing the risk to the computing device further includes determining, based on the data from the location detector, that the computing device is in one or more of: an unexpected location, or a location associated with an elevated risk of damage to the computing device.

7. The method of claim 1, wherein identifying occurrence of the event posing the risk to the computing device further includes analyzing the sensor data for the computing device in conjunction with previously-received sensor data for the computing device.

8. The method of claim 1, wherein identifying occurrence of the event posing the risk to the computing device further includes detecting malware on the computing device based on the results of the diagnostics.

9. A non-transitory, computer-readable medium storing instructions that, when executed by one or more computing devices, cause the one or more computing devices to:

receive sensor data pertaining to a first computing device from a plurality of sensors coupled to the first computing device, wherein the sensors include an accelerometer and a gyroscope;

obtain data from the gyroscope, the data indicating an extent of rotation of the first computing device during a period of free fall;

identify, based on the sensor data for the first computing device, occurrence of an event posing a risk of damage to the first computing device, wherein identifying the event includes:

determining a plurality of computing devices having a characteristic in common with the first computing device, selecting a threshold associated with a force of impact based on historical damage data for the plurality of computing devices, wherein the historical damage data includes sensor data associated with damage that is received from computing devices other than the first computing device, determining that the sensor data for the first computing device exceeds the threshold, determining, based on data from the accelerometer, that the first computing device experiences deceleration, determining that the first computing device is dropped based on the period of free fall and the deceleration, and determining based on the data from the accelerometer and the data from the gyroscope that the first computing device was accidentally dropped;

obtain results of diagnostics for the first computing device, wherein the results of diagnostics include an image or video from a camera of the first computing device, the image or video including at least a portion of a screen of the first computing device, and wherein the results of diagnostics further include diagnostics from a diagnostics program operating on the first computing device;

identify a force of impact experienced by the first computing device;

identify, based on the results of the diagnostics and the identified force of impact, damage or potential damage to the first computing device;

transmit, to a second computing device, an electronic message including the sensor data for the first computing device, the results of the diagnostics, and identification information for the first computing device, wherein the second computing device is configured to send a reply communication;

in response to receiving the reply communication, transmit an electronic message to the first computing device regarding the event; and modify, based on the sensor data for the first computing device, risk data for the plurality of computing devices.

10. A system comprising:

one or more computing devices; and memory in communication with the one or more computing devices and storing instructions that, when executed by the one or more computing devices, cause the one or more computing devices to:

receive sensor data pertaining to a first computing device from a plurality of sensors coupled to the first computing device, wherein the sensors include an accelerometer and a gyroscope;

obtain data from the gyroscope, the data indicating an extent of rotation of the computing device during a period of free fall;

identify, based on the sensor data for the first computing device, occurrence of an event posing a risk of damage to the first computing device, wherein identifying the event includes:

determining a plurality of computing devices having a characteristic in common with the first computing device, selecting a threshold associated with a force of impact based on historical damage data for the plurality of computing devices, wherein the historical damage data includes sensor data associated with damage that is received from computing devices other than the first computing device, determining that the sensor data for the first computing device exceeds the threshold, determining, based on data from the accelerometer, that the first computing device experiences deceleration, determining that the first computing device is dropped based on the period of free fall and the deceleration, and determining based on the data from the accelerometer and the data from the gyroscope that the first computing device was accidentally dropped;

obtain results of diagnostics for the first computing device, wherein the results of diagnostics include an image or video from a camera of the first computing device, the image or video including at least a portion of a screen of the first computing device, and wherein the results of diagnostics further include diagnostics from a diagnostics program operating on the first computing device;

identify a force of impact experienced by the first computing device;

identify, based on the results of the diagnostics and the identified force of impact, damage or potential damage to the first computing device;

transmit, to a second computing device, an electronic message including the sensor data for the first computing device, the results of the diagnostics, and identification information for the first computing device, wherein the second computing device is configured to send a reply communication;

in response to receiving the reply communication, transmit an electronic message to the first computing device regarding the event; and modify, based on the sensor data for the first computing device, risk data for the plurality of computing devices.

* * * * *